US012694240B2

(12) United States Patent
Bellows et al.

(10) Patent No.: US 12,694,240 B2
(45) Date of Patent: Jul. 28, 2026

(54) PORTING CONFIGURATION FOR HIGH DENSITY MULTIPLEXING OF RFID READERS

(71) Applicant: ZEBRA TECHNOLOGIES CORPORATION, Lincolnshire, IL (US)

(72) Inventors: David Bellows, Fort Salonga, NY (US); Mark W. Duron, Mastic, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/805,246

(22) Filed: Aug. 14, 2024

(65) Prior Publication Data

US 2026/0050756 A1 Feb. 19, 2026

(51) Int. Cl.
*G06K 7/10* (2006.01)

(52) U.S. Cl.
CPC ............................... *G06K 7/10316* (2013.01)

(58) Field of Classification Search
CPC .................................................. G06K 7/10316
See application file for complete search history.

(56) References Cited

U.S. PATENT DOCUMENTS

2010/0259364 A1* 10/2010 Man ................... G06K 7/10356
340/10.1

* cited by examiner

*Primary Examiner* — Jamara A Franklin

(57) ABSTRACT

Porting configurations for high density multiplexing of RFID readers are disclosed herein. An example RFID reader includes a housing, a printed circuit board (PCB) disposed within the housing, an internal multiplexer disposed within the housing, and electrically connected to the PCB; and a plurality of connectors disposed in a porting area of the housing, each of the plurality of connectors comprising a plurality of antenna ports, wherein each antenna port is communicatively coupled to the PCB via the internal multiplexer and is connectable with a respective RFID antenna.

28 Claims, 7 Drawing Sheets

100

106    104

102   102    102

700

710  Providing a base unit including a PCB

720  Providing a plurality of connectors

730  Connecting a plurality of RFID accessories to the PCB via the connectors

740  Collecting Data via the RFID accessories

750  Engaging in an action responsive to the Data

PORTING CONFIGURATION FOR HIGH DENSITY MULTIPLEXING OF RFID READERS

BACKGROUND

Radio frequency identification (RFID) systems often require extensive cabling and wiring networks to connect the various RFID antennas to an RFID reader assembly. These cabling networks frequently multiplex several wires or cables through a multiplexer to provide communication between the RFID reader and increasing quantities of RFID antennas. Cost and quantity of materials rapidly rise when implementing RFID systems with large quantities of RFID antennas, thus there is a need for methods and systems for increasing the amount of RFID antennas connectable to an RFID reader, preferably while reducing cost and quantity of materials.

SUMMARY

In an embodiment, the present invention is an RFID reader, including a housing, a printed circuit board (PCB) disposed within the housing, an internal multiplexer disposed within the housing, and electrically connected to the PCB, and a plurality of connectors disposed in a porting area of the housing, each of the plurality of connectors comprising a plurality of antenna ports, wherein each antenna port is communicatively coupled to the PCB via the internal multiplexer and is connectable with a respective RFID antenna.

In a variation of this embodiment, the plurality of connectors is disposed such that the porting area of the RFID reader is configured to support a connection density of at least 1.82 antenna ports per square centimeter (cm$^2$) in the porting area.

In a variation of this embodiment, the plurality of antenna ports comprises a plurality of 100-ohm differential antenna ports.

In a variation of this embodiment, each connector of the plurality of connectors is selected from a group consisting of an 8-position/8-contact (8P8C) connector, a 6-position/6-contact (6P6C) connector, a 4-position/4-contact (4P4C) connector, and a 10-position/10-contact (10P10C) connector.

In a variation of this embodiment, each connector includes four antenna ports.

In a variation of this embodiment, the RFID reader is directly communicable with at least twenty-four distinct RFID signals, and the plurality of antenna ports supporting communication with the at least twenty-four distinct RFID signals occupy an installation surface area of the porting area not more than 13.2 cm$^2$.

In a variation of this embodiment, the RFID reader is directly communicable with at least forty-eight distinct RFID signals, and the plurality of antenna ports supporting communication with the at least forty-eight distinct RFID signals occupy an installation surface area of the porting area not more than 26.4 cm$^2$.

In a variation of this embodiment, the RFID reader is directly communicable with at least ninety-six distinct RFID signals, and the plurality of antenna ports supporting communication with the at least ninety-six distinct RFID signals occupy an installation surface area of the porting area not more than 52.8 cm$^2$.

In a variation of this embodiment, each of the plurality of antenna ports is configured to transmit and receive data signals and radio frequency (RF) signals and transmit direct current.

In another embodiment, the present invention is a system, including an RFID reader, comprising a plurality of connectors disposed in a porting area of the RFID reader, each of the plurality of connectors comprising a plurality of differential ports, a plurality of RFID antennas, and a plurality of cables, wherein each of the plurality of cables is connectable to a connector of the plurality of connectors and connectable to four respective RFID antennas of the plurality of RFID antennas, such that four distinct RF signals are communicable between the RFID reader and the four respective RFID antennas via one respective cable of the plurality of cables and a corresponding connector of the plurality of connectors.

In a variation of this embodiment, each port of the plurality of differential ports is configured to transmit and receive data signals and RF signals and transmit direct current.

In a variation of this embodiment, the system further includes a load device configured to receive and transmit data signals and receive direct current, the load device being communicatively coupled to a port of the plurality of differential ports and being selected from a group consisting of: a display, a liquid crystal display (LCD), an electronic-paper display, a speaker, a microphone, an audio signaling device, a sensor, a light emitting diode (LED), an LED array, an LED display, an imaging device, a push button interface, and a thermostat.

In a variation of this embodiment, a given cable of the plurality of cables communicatively couples one or more RFID antennas of the plurality of RFID antennas and one or more load devices to the RFID reader via one corresponding connector of the plurality of connectors.

In a variation of this embodiment, a given RFID antenna of the plurality of RFID antennas is formed by a splayed wire pair of a corresponding cable of the plurality of cables.

In a variation of this embodiment, the RFID reader is directly communicable with at least ninety-six RFID antennas supported via twenty-four connectors, the plurality of connectors not occupying an installation surface area of the porting area more than 52.8 cm$^2$.

In a variation of this embodiment, the plurality of connectors comprises a plurality of Registered-Jack 45 (RJ45) connectors.

In a variation of this embodiment, the plurality of cables comprises a plurality of category 6 (CAT6) cables.

In yet another embodiment, the present invention is a method of configuring an RFID reader, including providing a base unit, comprising: a housing, a printed circuit board (PCB) disposed within the housing, and an internal multiplexer disposed within the housing and electrically connected to the PCB, providing a plurality of connectors, the plurality of connectors disposed in a porting area of the housing, such that each of the plurality of connectors extend through the housing on which a porting area is defined, each of the plurality of connectors comprising four ports, and each port electrically connected to the PCB via the internal multiplexer, and connecting a plurality of RFID accessories to the PCB via a first connector of the plurality of connectors.

In a variation of this embodiment, the plurality of RFID accessories includes an RFID antenna.

In a variation of tis embodiment, RFID tag data is collectable to the RFID reader via at least one RFID antenna utilizing at least a connector of the plurality of connectors.

In a variation of this embodiment, the plurality of RFID accessories includes at least one load device configured to receive and transmit signals and receive direct current, the at least one load device being communicatively coupled to a given port and being selected from a group consisting of a display, a liquid crystal display (LCD), an electronic-paper display, a speaker, a microphone, an audio signaling device, a sensor, an LED, an LED array, an LED display, an imaging device, a push button interface, and a thermostat.

In a variation of this embodiment, the plurality of RFID accessories includes at least the at least one load device and at least one RFID antenna, wherein RFID tag data is collected by the RFID reader via the at least one RFID antenna, the at least one RFID antenna and the at least one load device being communicatively coupled to at least a connector of the plurality of connectors.

In a variation of this embodiment, the method further includes executing an action by the at least one load device responsive to the RFID tag data collected by the RFID reader via the at least one RFID antenna.

In a variation of this embodiment, load device data is collectable to the RFID reader via the at least one load device.

In a variation of this embodiment, the method further includes executing an action to modify a condition monitored by the at least one load device responsive to the load device data.

In a variation of this embodiment, the plurality of RFID accessories comprises one of four RFID accessories or eight RFID accessories.

In a variation of this embodiment, the plurality of connectors is disposed such that the porting area of the RFID reader is configured to support a connection density of at least 1.82 antenna ports per cm$^2$.

In a variation of this embodiment, the plurality of connectors includes six connectors, the plurality of connectors occupying an installation surface area of the porting area not more than 13.2 cm$^2$.

In a variation of this embodiment, the plurality of connectors includes twelve connectors, the plurality of connectors occupying an installation surface area of the porting area not more than 26.4 cm$^2$.

In a variation of this embodiment, the plurality of connectors includes twenty-four connectors, the plurality of connectors occupying an installation surface area of the porting area not more than 52.8 cm$^2$.

In a variation of this embodiment, the plurality of connectors comprises a plurality of Registered-Jack 45 (RJ45) connectors.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Figure 1:
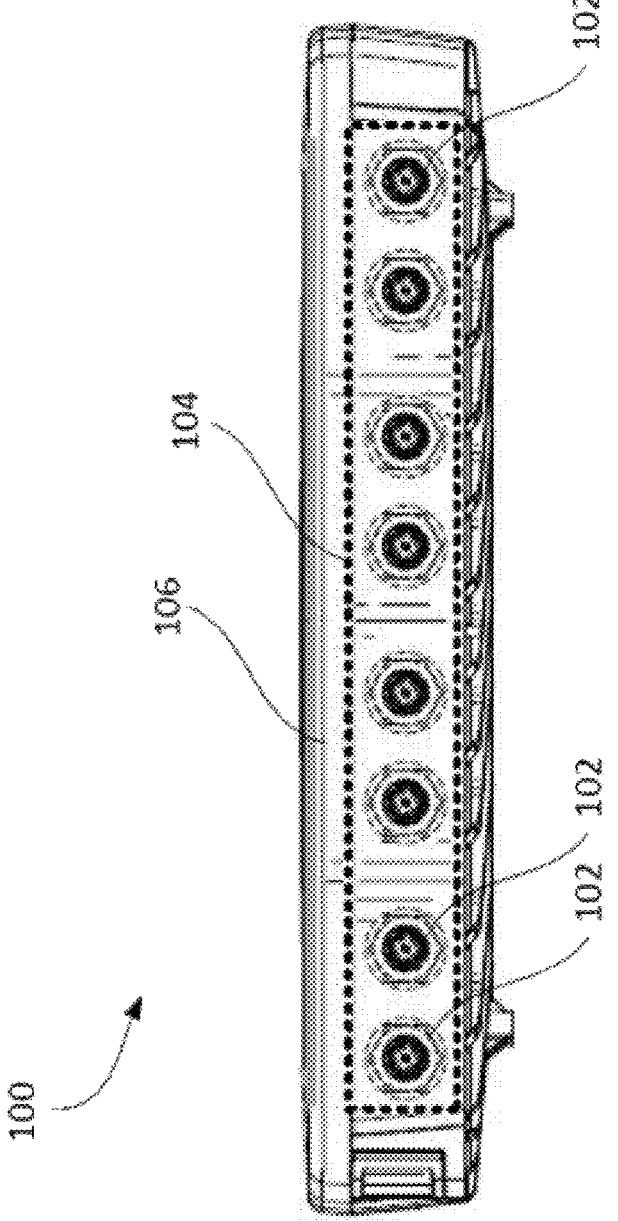
FIG. 1 illustrates an RFID reader having coaxial RF cable ports.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Many standardized RFID systems employ coaxial cable and Threaded Neill-Concelman (TNC) connections at the RFID reader to transmit radio frequency (RF) signals between RFID antenna(s) and RFID reader(s). These standardized systems may also employ reverse polarity TNC connections (RP-TNC), and it should be understood that references to TNC connections and connectors throughout the present disclosure may also refer to RP-TNC. A given coaxial cable carries RF signals between one RFID antenna and the RFID reader, as TNC connectors have one port per connector, thus limiting the number of potential RFID antenna connections to the RFID reader to the number of TNC connectors possessed by the RFID reader (e.g., excluding externally multiplexed configurations).

A known manner of increasing RFID antenna connections to an RFID reader is external multiplexing, which involves configuring one or more external multiplexers to increase the number of RFID antennas connectable with the RFID reader. This is often expensive as it consumes large quantities of materials and may complicate cable management when implemented in the field.

Another known manner of increasing RFID antenna connections to an RFID reader is increasing the number of connectors on the RFID reader, which requires allotting progressively more surface area of the RFID reader to house the connectors. As TNC connectors only have one RFID antenna port per connector, a lack of available surface area rapidly becomes the limiting factor as the number of connectors is increased, when the size of the RFID reader is fixed. Increasing the size of the RFID reader to accommodate more connections may be regarded as an undesirable concession when physical constraints (e.g., installation constraints) limit the size of the RFID reader.

The technology of the present disclosure provides for increasing a number of RFID antenna connections to an RFID reader through internal multiplexing, use of 8-position/8-contact (8P8C) connectors, and twisted wire pair cabling. The 8P8C connectors provide four ports per connector, allowing for four RFID antennas to be connectable to the RFID reader per connector. Furthermore, 8P8C connectors are smaller and support a greater packing density of connectors per unit area, which further increases the potential number of RFID antennas connectable to the RFID reader, without increasing the size of the RFID reader. 8P8C connectors, which quickly snap into place, are also easier to mate together than TNC connectors, which require a repetitive twisting motion to engage a set of screw threads. Additionally, twisted pair cabling (e.g., ethernet cable) is generally inexpensive and is lighter and more pliable compared to coaxial cables, which improves the ease of use when installing an RFID system.

FIG. 1 illustrates a view of an RFID reader 100 having eight Threaded Neill-Concelman (TNC) connectors 102. The RFID reader 100 is an example RFID reader assembly, which is used herein as a representation of the prior art. The RFID reader 100 includes a housing 106 which defines a porting area 104 having a fixed first surface area. Each of the TNC connectors 102 are housed within the porting area 104, and each TNC connector 102 provides one antenna port (e.g., differential antenna port). Without an external multiplexer, the RFID reader 100 is limited to eight RFID antenna connections provided by the eight TNC connectors.

In this disclosure, reference is made to surface areas occupied by various connectors (e.g., TNC connectors 102, 8P8C connectors 202 (See FIG. 2)). A given connector may have a first surface area metric corresponding to an area of a planar section of the connector, which is referred to herein as an occupational surface area. A given connector may also have an approximate minimum surface area required for installation among other connectors or features of the device. As such, additional space for clearance is allotted to each connector when configuring the connectors. The additional clearance space may be determined based on space necessary to connect compatible connectors and cables which are to be connected to each connector, among other considerations. The approximate minimum surface area required for installation is a second surface area metric, referred to herein as installation surface area.

As illustrated, the packing density of the TNC connectors 102 in the porting area 104 is near a maximum, given the total surface area of the porting area 104. For example, a TNC connector 102 has an occupational surface area, approximately 2.0 square centimeters (cm²), and an installation surface area, approximately 3.25 cm². Each TNC connector 102 supports one antenna port per connector. Thus, the porting density of TNC connectors 102, given by the number of antenna ports per square centimeter of installation surface area, is approximately 0.31.

Figure 2:
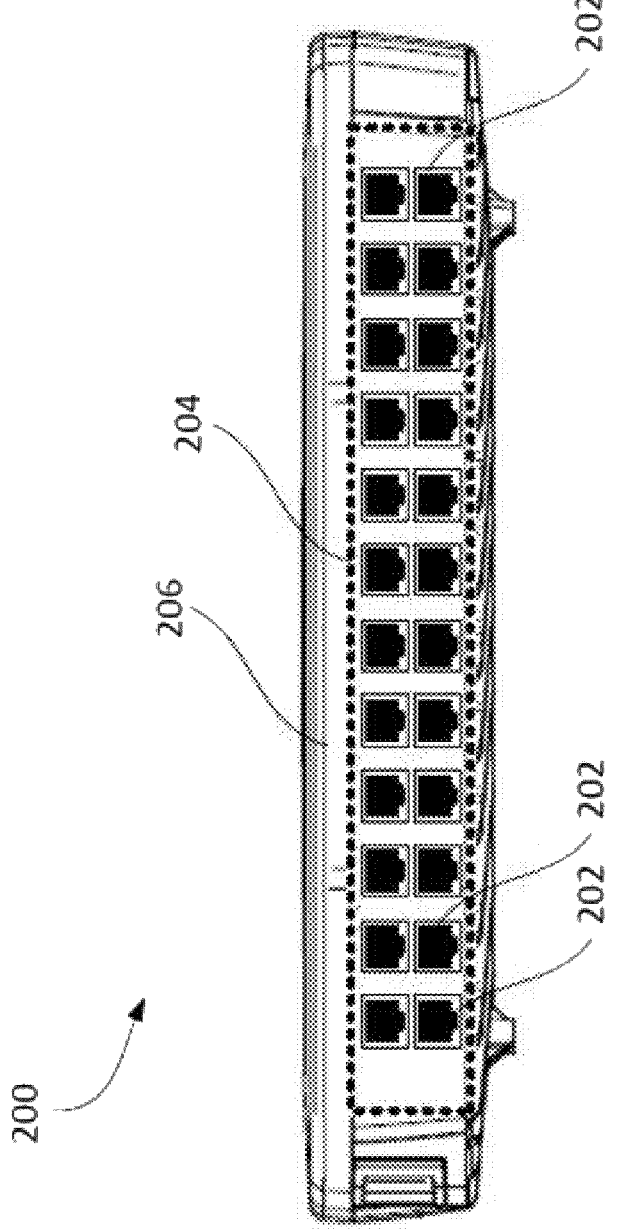
FIG. 2 illustrates an RFID reader having 8-position/8-contact connectors, according to embodiments of the present disclosure.

FIG. 2 illustrates an RFID reader 200, in which the porting area 204 includes twenty-four 8-position/8-contact (8P8C) connectors 202, according to embodiments of the present disclosure. The RFID reader 200 includes a housing 206 defining a porting area 204. The RFID reader 100 of FIG. 1 and the RFID reader 200 of FIG. 2 are dimensionally matched, and the surface area of the porting areas 104 and 204 are matched between the RFID readers 100 and 200. Each of the 8P8C connectors 202 are housed in the porting area 204, and each 8P8C connector 202 provides as many as four antenna ports (e.g., differential antenna ports).

Each 8P8C connector 202 has an occupational surface area of approximately 1.90 cm², and clearances between each 8P8C connector may be as little as 1 millimeter (e.g., from an edge of a given 8P8C connector 202 to the most proximate edge of a neighboring 8P8C connector 202). Thus, each 8P8C connector 202 may be allotted as little as 2.20 cm² of installation surface area of the porting area 204 when installed in the RFID reader 200. It should be understood that each 8P8C connector 202 may alternatively have an occupational surface area as low as 1.60 cm². Each 8P8C connector 202 supports four antenna ports per connector; thus, the porting density of 8P8C connectors 202 is approximately 1.82, which represents more than a five-fold increase when compared to the porting density of TNC connectors 102 of the RFID reader 100 of FIG. 1.

According to some examples, the twenty-four 8P8C connectors 202 collectively support as many as ninety-six antenna ports while requiring not more than 52.8 cm² of installation surface area of the porting area 204.

Although illustrated as having twenty-four 8P8C connectors, embodiments having fewer 8P8C connectors 202 are contemplated. An RFID reader 200 may include twelve 8P8C connectors 202 in the porting area 204, the twelve 8P8C connectors 202 supporting as many as forty-eight antenna ports while not occupying more than 26.4 cm² of installation surface area of the porting area 204.

According to some embodiments, the RFID reader 200 may include six 8P8C connectors 202 in the porting area 204, the six 8P8C connectors 202 supporting as many as twenty-four antenna ports while not occupying more than 13.2 cm² of installation surface area of the porting area 204.

According to some embodiments, the RFID reader 200 may include between one and six 8P8C connectors 202, between seven and twelve 8P8C connectors 202, between twelve and twenty-four 8P8C connectors 202, or more than twenty-four 8P8C connectors 202.

According to some embodiments, the 8P8C connectors 202 may be Registered-Jack 45 (RJ45) connectors. This disclosure further contemplates embodiments in which the RFID reader 200 includes other types of connectors, such as modular connectors including 6-position/6-contact (6P6C) connectors, 4-position/4-contact (4P4C) connectors and 10-position/10-contact connectors.

Figure 3:
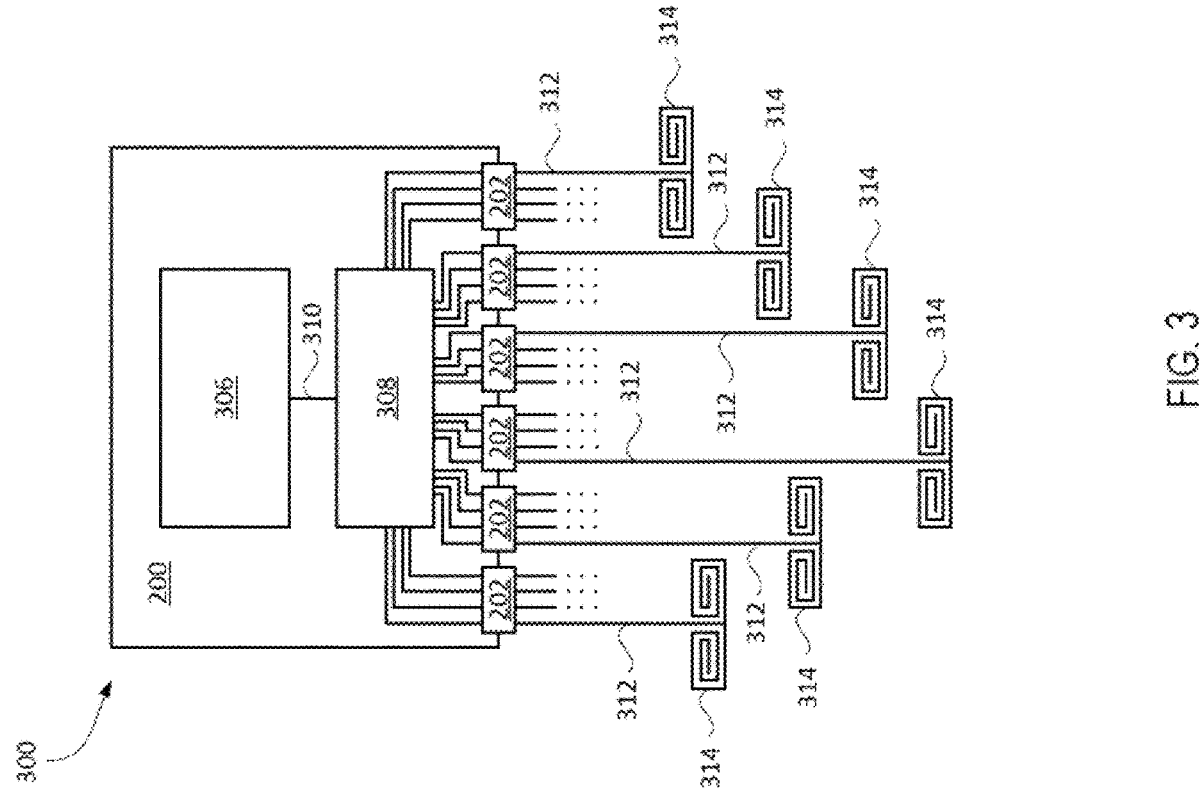
FIG. 3 illustrates a schematic diagram of an RFID system including RFID antennas, according to embodiments of the present disclosure.

FIG. 3 illustrates a schematic diagram of an RFID system 300, including an RFID reader 200, according to embodiments of the present disclosure. The RFID reader 200 includes a printed circuit board (PCB) 306 connected to an internal multiplexer 308 via electrical/RF line 310. The RFID reader 200 further includes 8P8C connectors 202, which are wired to the internal multiplexer 308. As illustrated, the RFID system 300 includes six 8P8C connectors 202. This disclosure contemplates embodiments where the RFID reader 200 may have more or fewer 8P8C connectors 202 and is illustrated with six 8P8C connectors 202 for simplicity and ease of viewing. Each antenna port contained in each 8P8C connector 202 is wired into the internal multiplexer 308, where RF signals carried through each port are forwarded to the single electrical/RF line 310 connecting the internal multiplexer 308 and the PCB 306. Each antenna port is connectable to a respective RFID antenna 314 via an RFID cable 312 (e.g., twisted wire pair).

According to some embodiments, the 8P8C connectors 202 are RJ45 connectors, and the RFID cables 312 are individual twisted pairs of wires that comprise Category 6 (CAT6) or Category 6A (CAT6A) ethernet cables. It should be understood that references to CAT6 ethernet cable throughout the present disclosure may refer to CAT6A. Each CAT6 cable is comprised of four twisted pairs of wires. Cross talk, or interference, is minimized by different twist rates of the wire pairs. The impedance of CAT6 cables and RJ45 connectors is 100 ohms, and impedances of 50 ohms or 75 ohms are standard for most RF systems and components. As such, in some embodiments, each port may include a balun, or conventional impedance matching components between connector 202 and internal multiplexer 308 to reduce or prevent reflections of RF signals transmitted along the RFID cable 312 between the RFID antennas 314 and the PCB 306. In some examples, the PCB 306, the internal multiplexer 308 and the RFID antennas 314 may be configured to have impedances of 100 ohms, which may preclude a necessity for impedance matching components.

In some examples, an RFID antenna 314 may be formed by splaying one of the twisted wire pairs of a respective RFID cable 312 to an appropriate length, such that the RFID antenna 314 is configured to compatibly interface with a predetermined RF interrogation signal or emit an RF signal in a predetermined RF band. For example, a twisted wire pair splayed to have two end lengths of 82 millimeters (164 mm total) may emit and receive RF signals at 915 megahertz (MHz). This 82 mm length corresponds to a quarter wavelength at 915 MHz and therefore provides for an optimal dipole antenna at this frequency. In this embodiment, the need for a separate physical antenna for the RFID cable 312 to connect to is obviated since the RFID antenna 314 is formed from the RFID cable 312 itself.

Figure 4:
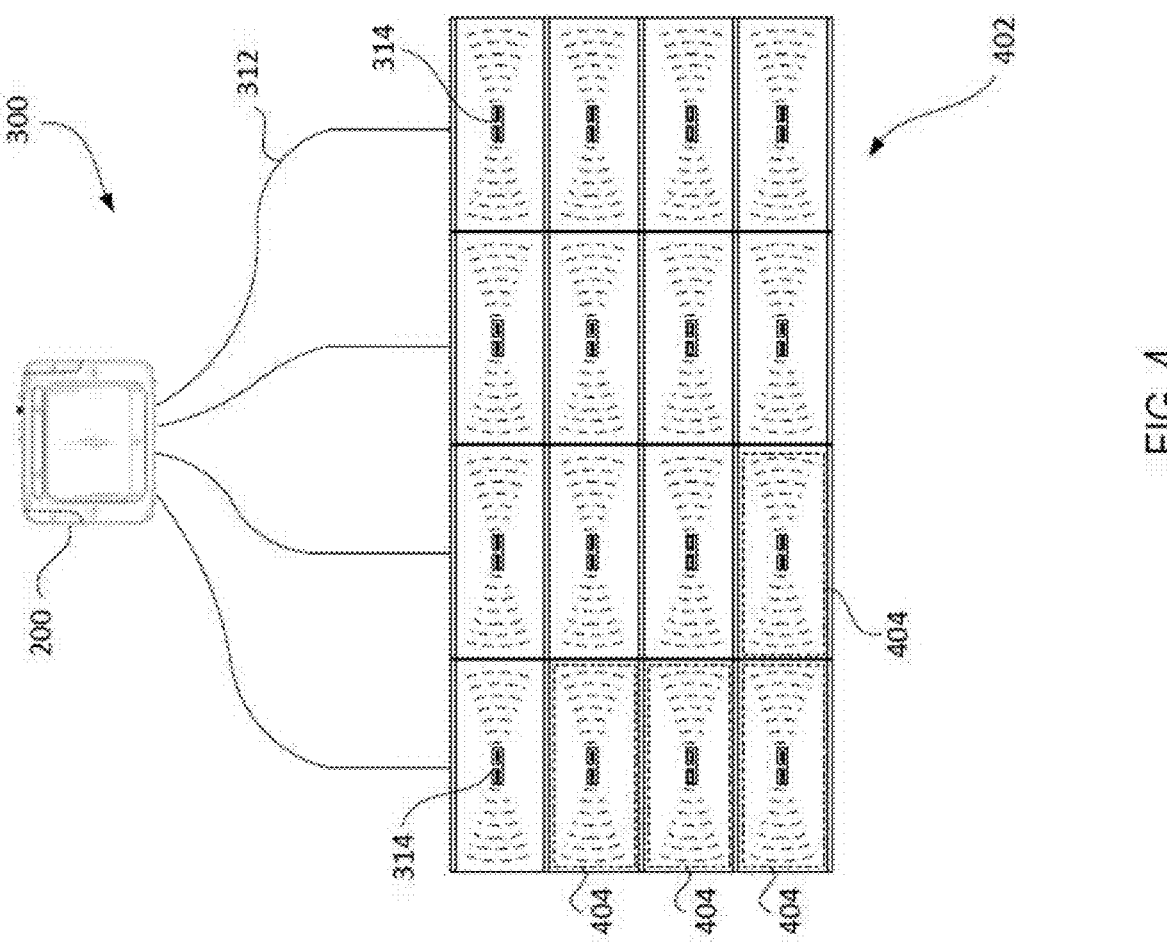
FIG. 4 illustrates an RFID enabled shelving system, according to embodiments of the present disclosure.

FIG. 4 illustrates a system 400, including the RFID system 300 of FIG. 3, according to embodiments of the present disclosure. The system 400 includes a spatial organizing apparatus 402 (e.g., shelving) having distinct zones 404 (e.g., individual shelves). As illustrated, the spatial organizing apparatus includes four banks of four shelves each, each shelf including a distinct zone 404. The spatial organizing apparatus 402 is merely exemplary of many possible configurations, which may vary in both form and scale without departing from the scope of the present disclosure. Each distinct zone 404 has a corresponding RFID antenna 314 which is configured to interface with (e.g., transmit a signal to, receive a response from, read, decode, etc.) RFID tags which may be present in or enter into the distinct zone 404. The RFID antennas 314 are connected to an RFID reader 200 via RFID cables 312. According to some embodiments, the RFID cables 312 are CAT6 cables, each comprising four respective twisted wire pairs, where each twisted wire pair is configured to support a connection with a respective RFID antenna 314. In this manner, one CAT6 cable can support connections to four RFID antennas 314, thus supporting RFID antennas 314 for an entire bank of shelves. Furthermore, when the RFID antennas 314 are formed by splaying the twisted wire pairs of respective RFID cables 312 to an appropriate length as described above, the amount of hardware is minimized, and the antenna size is reduced. This simplifies installation, makes it more flexible, and reduces cost.

Furthermore, the RFID reader 200 of FIG. 4 may be configured to include twenty-four 8P8C connectors 202, capable of interfacing with twenty-four CAT6 cables. Thus, a single RFID reader 200 may support connections to ninety-six RFID antennas 314.

In some examples, the PCB 306 and 8P8C connectors 202 of the RFID reader 200 may be equipped to support transmission of direct current (DC) and transmission and reception of data over the RFID cables 312. In this manner, the RFID reader 200 may service various load devices configured to operate when supplied with direct current and data signals. Such load devices may include, but are not limited to a display, (e.g., a liquid crystal display (LCD) or an electronic-paper display, as may be used for a shelf label), a speaker, a microphone, an audio signaling device (e.g., a beeper or buzzer), a sensor, a light emitting diode (LED), an LED array, an LED display, an imaging device (e.g., a camera, a barcode scanner), a push button interface, a thermostat, and other such devices and accessories. In this manner, numerous additional functions and services can be provided at each distinct zone 404. As a non-limiting example, an electronic shelf label (e.g., display) may be provided at a given distinct zone 404, which may indicate information pertaining to an item appearing in the given distinct zone 404 (e.g., price), and the electronic shelf label may be updated electronically via the RFID reader 200 to reflect new or different information. In another non-limiting example, the distinct zone 404 may be disposed in a refrigerator, or temperature-controlled environment, and a thermostat may be provided in the distinct zone 404, such that the temperature of the temperature controlled environment may be monitored through the RFID system 300, which may further include a connection to a heating or cooling system to be operated based on temperature data received from the thermostat. In this way, a new synergy is generated by utilizing the same hardware (e.g., the RFID reader, the cables, the load devices, the antennas, and the like) to (a) read RFID tags at the shelf and (b) utilize data associated with the read RFID tags to execute meaningful actions.

In some examples, the data and direct current connection may be used for shelf signage, such that prices may be updated dynamically and advertisements may be displayed on the signage. In some examples, a push button device may be employed such that a user can signal to, or communicate with another user (e.g., a store customer signaling a store employee for assistance or a store employee at the shelf on the sales floor communicating with a store employee in the back stock room). In some examples, a push button device may be employed such that a user can get automated shopping suggestions, advertisements, and/or promotions. In some examples, a frequency counting device may be employed to map customer density, customer traffic patterns, or other metrics. Push-to-talk devices may be employed, where voice signals are carried over the data path, providing a rapid communication system through preexisting hardware. In similar examples, push-to-text devices may be used. In some examples, barcode PDF displays may be employed for sales eligibility. In some examples, LEDs may be employed for signage, lighting, signals to users, and/or decoration. In some examples, certain devices, such as shelf cameras, may be configured to monitor inventories of non-RFID tagged items. In some examples, certain devices may be configured to provide automated low-stock and out of stock alerts to a user. In some examples, certain devices may be configured to communicate inventory data and planogram compliance to a user. In some examples, notifications of sweep events, which are when a number of items that exceed a threshold quantity are removed from a shelf within a threshold time period, indicating a possible theft, are provided to a user. In some examples, certain devices may be configured to monitor ambient or environmental conditions. In each of the above examples, a great diversity of means of obtaining data and conducting meaningful actions in response is enabled via the RFID system 300 without requiring extensive infrastructure additions.

Figure 5:
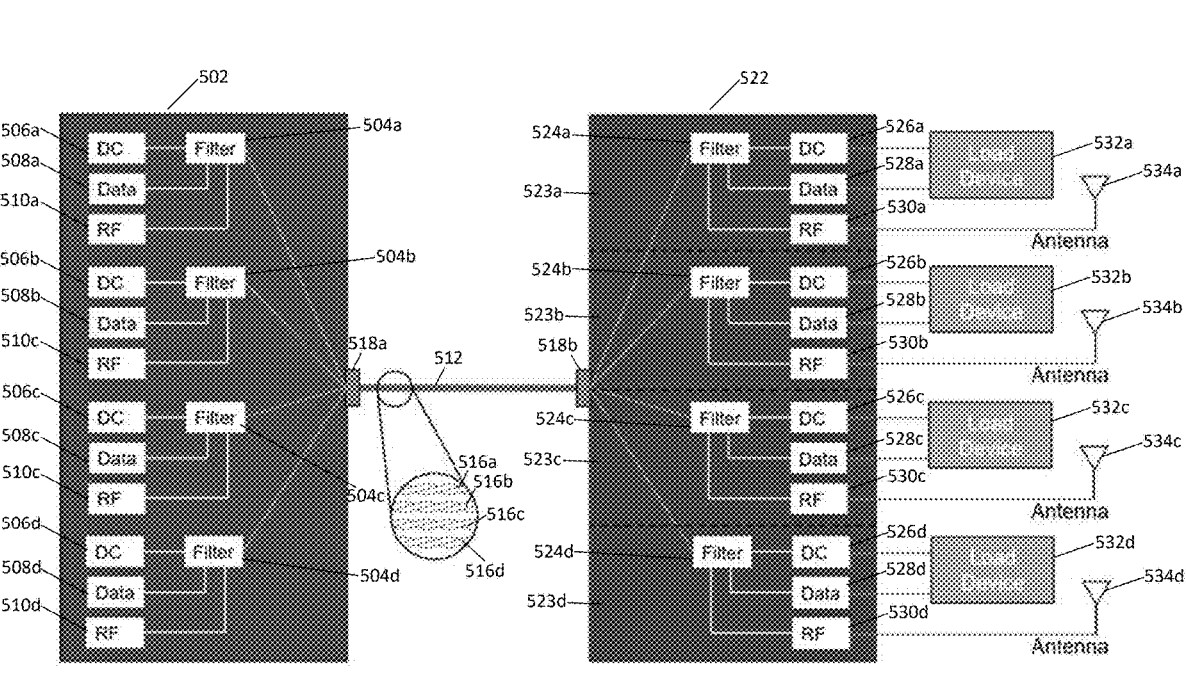
FIG. 5 illustrates a schematic diagram of an RFID system including an RFID reader communicatively coupled to load devices and RFID antennas, according to embodiments of the present disclosure.

FIG. 5 illustrates a schematic diagram of an RFID system 500 including an RFID reader 502 communicatively coupled to load devices 532a-d and RFID antennas 534a-d. As shown in FIG. 5, the system 500 includes an RFID reader 502 having filters 504a-d, a shelving unit 522 having shelves 523a-d respectively including filters 524a-d, load devices 532a-d, and antennas 534a-d, and a cable 512 (e.g., a Cat6 cable) having twisted wire pairs 516a-d and connectors 518a-b (e.g., 8P8C connectors such as RJ45 connectors) that communicatively couples the RFID reader 502 to the load devices 532a-d and RFID antennas 534a-d.

The system 500 provides for the transmission of direct current (DC) and the transmission and reception of data and radio frequency (RF) signals over the cable 512. In the RFID reader 502, the filters 504a-d may be used to respectively combine the DC 506a-d, data 508a-d, and RF signals 510a-d. Multiple sets of DC 506a-d, data 508a-d, and RF signals 510a-d can each be combined. As shown in FIG. 5, this combination takes place in four instances. For simplicity, DC is represented by a single line between the "DC" blocks 506a-d and 526a-d and the "Filter" blocks 504a-d and 524a-d but refers to two electrical lines (e.g., power and ground). Similarly, for simplicity, data is represented by a single line between the "Data" blocks 508a-d and 528a-d and the "Filter" blocks 504a-d and 524a-d but refers to two electrical lines (e.g., signal and ground). Again, for simplicity, RF is represented by a single line between the "RF" blocks 510a-d and 530a-d and the "Filter" blocks 504a-d and 524a-d but refers to two electrical lines (e.g., RF and ground). Additionally, each of the resulting combinations is shown for simplicity as a single line between the "Filter" blocks 504a-d and the RJ45 connector 518a and the "Filter" blocks 524a-d and the RJ45 connector 518b, but refers to two electrical lines. Each of these sets of combined electrical lines may be routed to 8P8C connectors, which may be RJ45 connectors. Each 8P8C connector may be connected to up to four sets of combined electrical lines. A single RFID cable 512 may connect to each 8P8C connector, enabling each of the four sets of combined electrical lines to connect to each of the four sets of twisted wire pairs 516a-d comprising the RFID cable 512 (e.g., a Cat6 cable). In an embodiment, when the connector is a 6P6C connector, the 6P6C connector may be connected to up to three sets of combined electrical lines. In another embodiment, when the connector is a 4P4C connector, the 4P4C connector may be connected to up to two sets of combined electrical lines. In yet another embodiment, when the connector is a 10P10C connector, the 10P10C connector may be connected to up to five sets of combined electrical lines.

As shown in FIG. 5, a first end of the RFID cable 512 is coupled to the RFID reader 502 via the RJ45 connector 518a and a second end of the RFID cable 512 is coupled to the shelving unit 522 via the RJ45 connector 518b. The shelving unit 522 may include separate enclosures to house each filter 524a-d, and each enclosure may be mounted to the shelves or may be integrated into the shelves themselves. Alternatively, the shelving unit 522 may include an enclosure housing the filters 524a-d, and the enclosure may be mounted to a shelf or may be integrated into a shelf. A set of filters 524a-d may split, or separate out, the DC, data, and RF signals transmitted via twisted wire pairs 516a-d of the RFID cable 512. For each twisted wire pair 516a-d, the separated DC and separated data may be routed to/from a load device 532a-d, and the separated RF signals may be routed to/from an RFID antenna 534a-d.

Thus, four RFID antennas 534a-d and four load devices 532a-d are communicatively coupled to the RFID reader 502 via one RFID cable 512 (e.g., a Cat6 cable), and 8P8C connectors (e.g., RJ45 connectors 518a and 518b), at each end of the RFID cable 512. It should be understood that for every additional 8P8C connector disposed in a porting area of a housing of the RFID reader 502, a quantity of RFID antennas 534 and load devices 532 communicatively coupled to the RFID reader 502 may each increase by up to four. For example, an RFID reader 502 with twenty-four 8P8C connectors 202 may have up to twenty-four RFID cables 512 connected to it to communicatively couple the RFID reader 502 to up to ninety-six RFID antennas 534 and up to ninety-six load devices 532.

Figure 6:
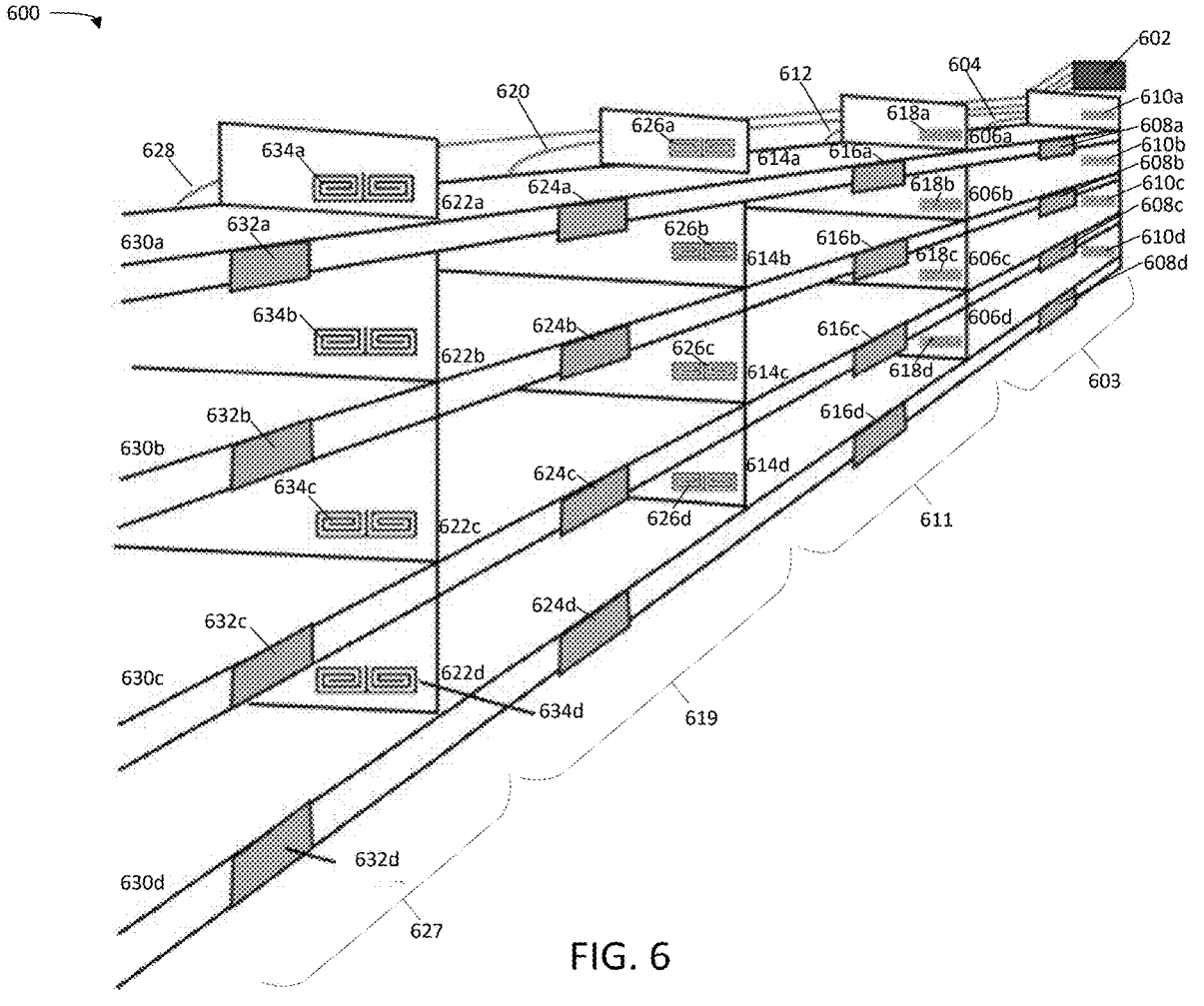
FIG. 6 illustrates a diagram of an RFID system including an RFID reader communicatively coupled to load devices and RFID antennas, according to embodiments of the present disclosure.

FIG. 6 illustrates a schematic diagram of an RFID system 600 including an RFID reader 602 communicatively coupled to load devices 608a-d, 616a-d, 624a-d, and 632a-d and antennas 610a-d, 618a-d, 626a-d, and 634a-d. As shown in FIG. 6, the RFID reader 602 is communicatively coupled to components (e.g., load devices 608a-d, 616a-d, 624a-d, and 632a-d and antennas 610a-d, 618a-d, 626a-d, and 634a-d) of respective shelving units 603, 611, 619, and 627 via respective cables 604, 612, 620, and 628. For example, the RFID reader 602 is communicatively coupled to load devices 608a-d and antennas 610a-d of respective shelves 606a-d of shelving unit 603 via cable 604. In another example, the RFID reader 602 is communicatively coupled to load devices 616a-d and antennas 618a-d of respective shelves 614a-d of shelving unit 611 via cable 612. In yet another example, the RFID reader 602 is communicatively coupled to load devices 624a-d and antennas 626a-d of respective shelves 622a-d of shelving unit 619 via cable 620. In yet another example, the RFID reader 602 is communicatively coupled to load devices 632a-d and antennas 634a-d of respective shelves 630a-d of shelving unit 627 via cable 628. In this way, the system 600 provides for higher port density at the RFID reader 602 as well as the ability to transmit direct current and transmit and receive data and RF signals via the same cable (e.g., cables 604, 612, 620 and 628).

The RFID reader 602 includes four 8P8C connectors (not shown) and therefore sixteen ports supporting load device and antenna functionality for sixteen individual shelves (e.g., shelves 606a-d, 614a-d, 622a-d, and 630a-d of respective shelving units 603, 611, 619, and 627). It should be understood that the RFID reader can include varying types of connectors and, as such, can support load device and antenna functionality for more or less individual shelves. For example, an RFID reader with twenty-four 8P8C connectors may support load device and antenna functionality in a relatively longer aisle of shelving in a "big box" store. In another example, an RFID reader with 10P10C connectors may support load device and antenna functionality for banks of shelving units with five individual shelves each.

The RFID reader 602 may be located at one end of the aisle, such as near or at an endcap, to service a set of shelves on one side of the RFID reader. Alternatively, the RFID reader 602 may be centrally located in the aisle and service shelves on both sides of the RFID reader 602. A single RFID cable may be connected to an 8P8C connector of the RFID reader for each bank of four shelves, and the other end of each RFID cable may be connected to a second 8P8C connector located at each shelf bank. This second 8P8C connector may be in an enclosure mounted to the shelf infrastructure, it may be part of a PCB assembly directly integrated with the shelf infrastructure, or the like. The second 8P8C connector may be located in any suitable position at or proximate to the shelves that is convenient for installation.

The cables 604, 612, 620, and 628 respectively service vertical units 603, 611, 619, and 627 of shelves. It should be understood that the cables 604, 612, 620, and 628 may service any suitable layout of shelving units (e.g., to accommodate the installation). The antennas 610a-d, 618a-d, 626a-d, and 634a-d may be positioned and oriented in any suitable position and orientation to achieve an optimal performance for the specific use case. The position and orientation of antennas 610a-d, 618a-d, 626a-d, and 634a-d shown in FIG. 6 are exemplary. The antennas 610a-d, 618a-d, 626a-d, and 634a-d may alternatively be located on another surface, such as the back, top, bottom, or other side of the shelf, for example. Generally, the antenna at each shelf may be capable of reading RFID tags affixed to items positioned on that shelf. The respective load devices 608a-d, 616a-d, 624a-d, and 632a-d are electronic shelf labels. For simplicity, the electrical connections to the load devices 608a-d, 616a-d, 624a-d, and 632a-d and the antennas 610a-d, 618a-d, 626a-d, and 634a-d are not explicitly shown, but it should be understood that these electrical connections can follow the electrical connections illustrated in FIG. 5.

As shown in FIG. 6, each electronic shelf label (e.g., load devices 608a-d, 616a-d, 624a-d, and 632a-d) may update its displayed content based on the RFID tags read at the corresponding shelf (e.g., shelves 606a-d, 614a-d, 622a-d, and 630a-d) by the corresponding antenna 610a-d, 618a-d, 626a-d, and 634a-d. As such, the system 600 is cohesive and integrated and provides for automatically and dynamically supporting a large number of shelves (e.g., ninety-six shelves) in real time via the same hardware. For example, load device updates, such as changing the content of an electronic shelf label display, occur in real time and in response to RFID tag data collected via the antenna at the same shelf for each of the shelves independently. As mentioned above, the system 600 provides for higher port density at the RFID reader 602 as well as the ability to transmit direct current and transmit and receive data and RF signals via the same cable (e.g., cables 604, 612, 620 and 628) such that a new synergy is generated by utilizing the same hardware (e.g., the RFID reader, the cables, the load devices, the antennas, and the like) to (a) read RFID tags at the shelf and (b) utilize data associated with the read RFID tags to execute meaningful actions.

Figure 7:
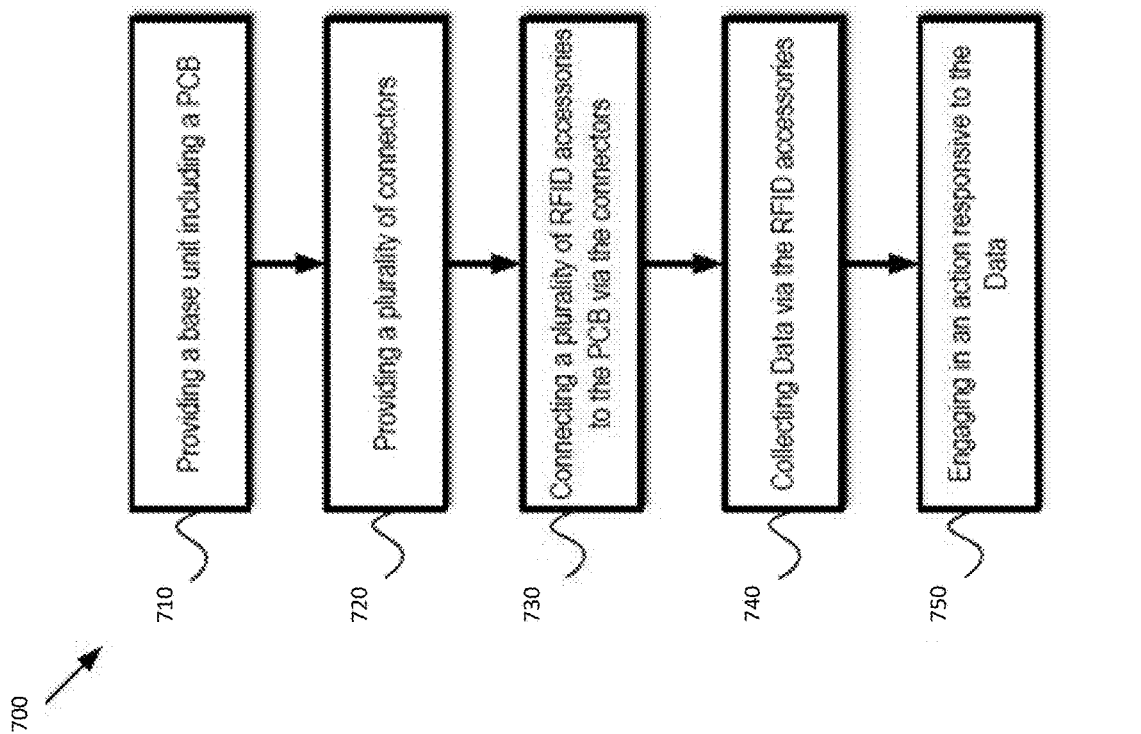
FIG. 7 illustrates a flowchart of a method for configuring an RFID reader, according to embodiments of the present disclosure.

FIG. 7 illustrates a flowchart of a method 700 for configuring an RFID reader. The method 700 may be employed to configure an RFID reader (e.g., RFID reader 200) to support connections to a plurality of RFID antennas, RFID accessories, or other load devices.

The method 700 may begin when a base unit including a PCB is provided (block 710), according to embodiments of the present disclosure. The base unit is provided in a manner such that further accessories or components may be coupled to the base unit (e.g., via installation, connection, or other manner of attachment). In some examples, the base unit includes a PCB (e.g., PCB 306), and may include a housing (e.g., housing 206), an internal multiplexer (e.g., the internal multiplexer 308). The PCB is in electrical communication with the multiplexer, and both the PCB and the multiplexer are disposed within the housing.

In another step of the method 700, a plurality of connectors is provided (block 720), according to embodiments of the present disclosure. The connectors (e.g., 8P8C connectors 202, cable jacks, cable ports) may be installed to the base unit so as to be electrically connected to the multiplexer, and through the multiplexer the connectors are electrically connected to the PCB. The connectors are installed in a porting area of the housing, such that the connectors are configured to provide electrical communication between cables disposed externally to the housing and the multiplexer within the housing. Said differently, the connectors extend through the housing, configured to electrically connect the multiplexer with one or more accessories which are compatible (e.g., connectable) with the connectors and disposed externally relative to the housing. According to some embodiments, the connectors are modular connectors, such as 8P8C connectors, 6P6C connectors, 4P4C connectors, or 10P10C connectors. In some examples, the connectors are RJ45 connectors. Each connector includes a plurality of antenna ports. According to some embodiments, the plurality of antenna ports includes a plurality of 100-ohm differential antenna ports. According to some embodiments, the plurality of antenna ports is 2 antenna ports, 3 antenna ports, 4 antenna ports, or 5 antenna ports. According to at least one embodiment, the plurality of antenna ports includes four 100-ohm differential RFID antenna ports.

According to some embodiments, the plurality of connectors includes six connectors configured such that the plurality of connectors occupies an installation surface area of the porting area occupying not more than 13.2 cm$^2$.

According to some embodiments, the plurality of connectors includes twelve connectors configured such that the plurality of connectors occupies an installation surface area of the porting area occupying not more than 26.4 cm$^2$.

According to some embodiments, the plurality of connectors includes twenty-four connectors configured such that the plurality of connectors occupies a surface area of the porting area occupying not more than 52.8 cm$^2$.

According to some embodiments, the connectors are configured such that the multiplexer receives inputs from and sends outputs to ninety-six antenna ports via the connectors.

According to some embodiments, the connectors are configured such that a connection density of antenna ports in the porting area is at least 1.82 antenna ports per cm$^2$.

The method 700 may continue with at least one of a plurality of RFID accessories being connected to the PCB via the connectors (block 730), according to embodiments of the present disclosure. In some examples, the plurality of RFID accessories includes a plurality of RFID antennas (e.g., RFID antennas 314). In some examples, the plurality of RFID accessories includes one or more load devices, including a display, (e.g., a liquid crystal display (LCD) or an electronic-paper display, as may be used for a shelf label), a speaker, a microphone, an audio signaling device (e.g., a beeper or buzzer), a sensor, an LED, an LED array, an LED display, an imaging device (e.g., a camera, a barcode scanner), a push button interface, a thermostat, and other such devices and accessories. In some examples, the plurality of RFID accessories includes one or more RFID antennas and one or more load devices. According to some embodiments, the load devices may be configured to receive and transmit data signals and receive direct current. According to some embodiments, a given load device is connectable to one antenna port.

According to some embodiments, block 730 of the method 700 includes connecting at least one RFID accessory to the PCB via a first connector of the plurality of connectors. In some examples, block 730 of the method 700 includes connecting four RFID accessories to the PCB via the first connector. In some examples, block 730 of the method 700 includes connecting eight RFID accessories to the PCB via the first connector.

According to some embodiments, ninety-six RFID accessories are connectable to the PCB via the plurality of connectors connected to the multiplexer. According to some embodiments, ninety-six RFID antennas and ninety-six load devices are connectable to the PCB via the plurality of connectors connected to the multiplexer.

According to some embodiments, the PCB, multiplexer, and connectors are configured such that the driving impedance and characteristic impedance of the RFID reader is 100-ohms.

The method 700 may continue by collecting data via the RFID accessories (block 740), according to embodiments of the present disclosure. RFID tag data may be collected by the PCB via one or more RFID antennas. Load device data may be collected by the PCB via one or more of the load devices. The collected RFID tag data and load device data may correspond to a condition (e.g., a change in a condition, an environmental condition, a stock condition, an occurrence of a predetermined event or lack thereof, a count of occurrences of the predetermined event, and the like) monitored or measured by a respective RFID accessory. In some examples, the load device data is temperature data from a thermostat when the RFID accessory is a thermostat. In some examples, the RFID tag data is corresponding to a quantity of RFID tags within the range of a given RFID antenna.

The method 700 may continue by engaging in an action responsive to the data collected by the PCB (block 750), according to embodiments of the present disclosure. The PCB may be programmed to initiate a response behavior (e.g., executing an action, program, or control sequence) responsive to the collected data, or when the collected data exhibits certain characteristics. In some examples, the PCB may be configured to alert a user of a condition that a given RFID accessory is configured to monitor as a response behavior. In some examples, the PCB may be configured to engage with a secondary device, where the secondary device is configured to affect, control, or change the condition that the RFID accessory monitors as a response behavior. As an example, if an RFID antenna is used to monitor a quantity of RFID tags present in the read range of the RFID antenna, the PCB may be configured to send an alert to a user device, or otherwise alert a user, when the quantity of RFID tags decreases below a predetermined threshold (e.g., a low stock indication). Alternatively, or additionally, the PCB may be configured to update the content of an electronic shelf label (load device) responsive to changes in the same metric. In this manner, if contents of a shelf (e.g., area in the read range of the RFID antenna) are modified to include a different RFID tagged item (e.g., product), the RFID antenna reads the RFID tag of the item, and the electronic shelf label responds accordingly by displaying information related to the new item. Similarly, the decreasing rate of change of the quantity of RFID tagged items in the RFID antenna read range (e.g., as captured by the RFID antenna reading unique RFID tags over a period of time) may be correlated with sales velocity (e.g., low rate of change correlates to a low sales velocity, high rate of change correlates to high sales velocity). A user may find it desirable to lower prices when the sales velocity is low to stimulate sales and increase prices when the sales velocity is high in order to increase profitability. In this manner, the PCB may be configured to modify the displayed price of the item on the electronic shelf label responsive to the rate of change data collected by the RFID antenna.

As another example, the load devices may include a push button and a display. The load devices may be disposed within the read range of an RFID antenna, such that the RFID antenna is configured to read the RFID tags of products possessed by a user engaging with the load devices. In this manner, if a customer brings an RFID tagged item in the vicinity of an RFID antenna and pushes the push button, the display may display information related to the item, such as shopping suggestions, product specifications, advertisements, and promotions.

As another example, the load device may be an LED array, containing one or more LEDs. The PCB may be configured to produce signals via the LED array, such as flashing sequences, color changes, and the like, to notify users of a condition (e.g., overstock, low stock, out-of-stock) in response to the RFID tags read by an RFID antenna. In this manner, the LED array may change to orange when the RFID tag data collected by the RFID antenna indicates there is a low stock condition, or to red when there is an out-of-stock condition (e.g., no RFID tags in the read range of the RFID antenna). In another example, the LED array may change color, or initiate a programmed sequence to indicate that an item is located in the vicinity of the LED array (e.g., at a shelf with which the LED array is associated). The LED signaling may facilitate locating a specific item that a user may be looking for.

As another example, the PCB may be configured to send automated electronic alerts (e.g., via audio, text, graphic, and the like) to users through a load device for low-stock and/or out of stock conditions, to communicate planogram compliance, and to notify users of sweep events, based on RFID tags read by an RFID antenna.

As another example, when the load device is a thermostat and the load device data is temperature data, the PCB may include a connection to a heating or cooling system, which is configured to change the ambient temperature in an environment in which the thermostat is disposed.

Stated generally, the method 700 may include executing an action by the at least one load device responsive to the RFID tag data collected by the RFID reader via the RFID antenna. The method 700 may include executing an action to modify a condition monitored by the at least one load device responsive to load device data.

The above description refers to a block diagram of the accompanying drawings. Alternative implementations of the example represented by the block diagram includes one or more additional or alternative elements, processes and/or devices. Additionally, or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. An RFID reader, comprising;
a housing;
a printed circuit board (PCB) disposed within the housing;
an internal multiplexer disposed within the housing, and electrically connected to the PCB; and
a plurality of connectors disposed in a porting area of the housing, each of the plurality of connectors comprising a plurality of antenna ports, wherein
each antenna port is communicatively coupled to the PCB via the internal multiplexer and is connectable with a respective RFID antenna, and
each connector of the plurality of connectors is selected from a group consisting of an 8-position/8-contact (8P8C) connector, a 6-position/6-contact (6P6C) connector, a 4-position/4-contact (4P4C) connector, and a 10-position/10-contact (10P10C) connector.

2. The RFID reader of claim 1, wherein the plurality of connectors is disposed such that the porting area of the RFID reader is configured to support a connection density of at least 1.82 antenna ports per square centimeter (cm$^2$) in the porting area.

3. The RFID reader of claim 1, wherein the plurality of antenna ports comprises a plurality of 100-ohm differential antenna ports.

4. The RFID reader of claim 1, wherein each connector comprises four antenna ports.

5. The RFID reader of claim 1, wherein the RFID reader is directly communicable with at least twenty-four distinct RFID signals, and the plurality of antenna ports supporting communication with the at least twenty-four distinct RFID signals occupy an installation surface area of the porting area not more than 13.2 cm$^2$.

6. The RFID reader of claim 1, wherein the RFID reader is directly communicable with at least forty-eight distinct RFID signals, and the plurality of antenna ports supporting communication with the at least forty-eight distinct RFID signals occupy an installation surface area of the porting area not more than 26.4 cm$^2$.

7. The RFID reader of claim 1, wherein the RFID reader is directly communicable with at least ninety-six distinct RFID signals, and the plurality of antenna ports supporting communication with the at least ninety-six distinct RFID signals occupy an installation surface area of the porting area not more than 52.8 cm$^2$.

8. The RFID reader of claim 1, wherein each of the plurality of antenna ports is configured to transmit and receive data signals and radio frequency (RF) signals and transmit direct current.

9. A system, comprising:
an RFID reader, comprising a plurality of connectors disposed in a porting area of the RFID reader, each of the plurality of connectors comprising a plurality of differential ports;
a plurality of RFID antennas; and
a plurality of cables, wherein
each of the plurality of cables is connectable to a connector of the plurality of connectors and connectable to four respective RFID antennas of the plurality of RFID antennas, such that four distinct RF signals are communicable between the RFID reader and the four respective RFID antennas via one respective cable of the plurality of cables and a corresponding connector of the plurality of connectors, and
the plurality of connectors comprises a plurality of Registered-Jack 45 (RJ45) connectors.

10. The system of claim 9, wherein each port of the plurality of differential ports is configured to transmit and receive data signals and radio frequency (RF) signals and transmit direct current.

11. The system of claim 10, further comprising a load device configured to receive and transmit data signals and receive direct current, the load device being communicatively coupled to a port of the plurality of differential ports and being selected from a group consisting of: a display, a liquid crystal display (LCD), an electronic-paper display, a speaker, a microphone, an audio signaling device, a sensor, a light emitting diode (LED), an LED array, an LED display, an imaging device, a push button interface, and a thermostat.

12. The system of claim 11, wherein a given cable of the plurality of cables communicatively couples one or more RFID antennas of the plurality of RFID antennas and one or more load devices to the RFID reader via one corresponding connector of the plurality of connectors.

13. The system of claim 9, wherein a given RFID antenna of the plurality of RFID antennas is formed by a splayed wire pair of a corresponding cable of the plurality of cables.

14. The system of claim 9, wherein the RFID reader is directly communicable with at least ninety-six RFID antennas supported via twenty-four connectors, the plurality of connectors not occupying an installation surface area of the porting area more than 52.8 cm$^2$.

15. The system of claim 9, wherein the plurality of cables comprises a plurality of category 6 (CAT6) cables.

16. A method of configuring an RFID reader, comprising:
providing a base unit, comprising: a housing, a printed circuit board (PCB) disposed within the housing, and an internal multiplexer disposed within the housing and electrically connected to the PCB;
providing a plurality of connectors, the plurality of connectors disposed in a porting area of the housing, such that each of the plurality of connectors extend through the housing on which a porting area is defined, each of the plurality of connectors comprising four ports, and each port electrically connected to the PCB via the internal multiplexer; and
connecting a plurality of RFID accessories to the PCB via a first connector of the plurality of connectors,
wherein the plurality of connectors comprises a plurality of Registered-Jack 45 (RJ45) connectors.

17. The method of claim 16, wherein the plurality of RFID accessories includes an RFID antenna.

18. The method of claim 17, wherein RFID tag data is collectable to the RFID reader via at least one RFID antenna utilizing at least a connector of the plurality of connectors.

19. The method of claim 16, wherein the plurality of RFID accessories includes at least one load device configured to receive and transmit data signals and receive direct current, the at least one load device being communicatively coupled to a given port, and being selected from a group consisting of: a display, a liquid crystal display (LCD), an electronic-paper display, a speaker, a microphone, an audio signaling device, a sensor, a light emitting diode (LED), an LED array, an LED display, an imaging device, a push button interface, and a thermostat.

20. The method of claim 19, wherein the plurality of RFID accessories includes at least the at least one load device and at least one RFID antenna, wherein RFID tag data is collected by the RFID reader via the at least one RFID antenna, the at least one RFID antenna and the at least one load device being communicatively coupled to at least a connector of the plurality of connectors.

21. The method of claim 20, further comprising executing an action by the at least one load device responsive to the RFID tag data collected by the RFID reader via the at least one RFID antenna.

22. The method of claim 19, wherein load device data is collectable to the RFID reader via the at least one load device.

23. The method of claim 22, further comprising executing an action to modify a condition monitored by the at least one load device responsive to the load device data.

24. The method of claim 16, wherein the plurality of RFID accessories comprises one of four RFID accessories or eight RFID accessories.

25. The method of claim 16, wherein the plurality of connectors is disposed such that the porting area of the RFID reader is configured to support a connection density of at least 1.82 antenna ports per cm$^2$.

26. The method of claim 16, wherein the plurality of connectors includes six connectors, the plurality of connectors occupying an installation surface area of the porting area not more than 13.2 cm$^2$.

27. The method of claim 16, wherein the plurality of connectors includes twelve connectors, the plurality of connectors occupying an installation surface area of the porting area not more than 26.4 cm$^2$.

28. The method of claim 16, wherein the plurality of connectors includes twenty-four connectors, the plurality of connectors occupying an installation surface area of the porting area not more than 52.8 cm$^2$.

\* \* \* \* \*